Sept. 12, 1961  J. W. MORRIS  2,999,779
METHOD AND APPARATUS FOR EDGE SEALING
Filed Nov. 18, 1957

INVENTOR.
JOHN W. MORRIS
BY Oscar L. Spencer
ATTORNEY

United States Patent Office 2,999,779
Patented Sept. 12, 1961

2,999,779
METHOD AND APPARATUS FOR EDGE SEALING
John W. Morris, Tarentum, Pa., assignor to Pittsburgh Plate Glass Company, Allegheny County, Pa., a corporation of Pennsylvania
Filed Nov. 18, 1957, Ser. No. 697,063
2 Claims. (Cl. 154—2.71)

This application relates to the manufacture of laminated glass, and more particularly to a method and apparatus for edge sealing of the plastic interlayer to the sheets of glass after a prepressing operation.

In the manufacture of laminated glass, such as modern automobile windshields, a sheet of relatively thin plastic is placed between two sheets of glass which have been cut to the desired contour and bent to a desired shape. The plastic forms the interlayer and, after its placement between the sheets of glass, it is subsequently trimmed to the contour of the glass sheets. The assembly of glass and plastic is then subjected to a prepressing operation wherein the temperature of the assembly is raised and pressure applied thereto to initially adhere the plastic sheet to the glass sheets. This prepressed assembly is finally subjected to the final pressing operation, usually in an oil autoclave. At times, some portions of the plastic sheet adjacent the edge of the laminate, especially at the sharp bends, which characterize modern windshields is not sealed to the glass after the prepressing operation, so that in the final pressing operation oil can enter the laminate. To alleviate this condition, any portions of the edge that are not sealed after prepressing are manually edge sealed to prevent the oil from entering the laminate during the final pressing operation. This edge sealing is accomplished immediately after prepressing by rolling and compressing the hot interlayer edge, so as to force it between the glass sheets in the sealing contact therewith, with a thin metal disc known in the trade as an edge roller.

The prior edge roller consisted of a relatively thin metal disc having annular hubs riveted to each side, the hubs facilitating the handling of the disc. In using this prior type of disc a relatively high percentage of breakage or spoilage of windshields occurred during the edge rolling operation, since the disc could not follow the sharp bends of the articles because of its rigidity. It has been found that the percentage of breakage and spoilage may be materially reduced by the use of the edge roller forming the subject matter of this application, which because of its construction is relatively flexible and able to follow the sharp bends of the prepressed laminates.

Therefore, the principal objective of this invention is the provision of an improved edge roller for use in the manufacture of laminated glass, such as bent automobile windshields.

A further objective is the provision of an improved method of manufacturing laminated glass articles, such as bent automobile windshields, including the edge sealing of the plastic interlayer to the glass after a prepressing operation.

These and other objectives and features will become apparent from the following description when taken with the accompanying drawing, in which.

Figure 2:
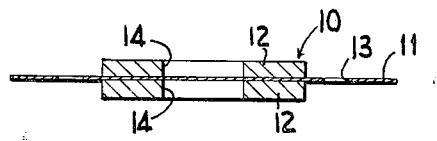
FIGURE 2 is a cross section taken on line 2—2 of FIGURE 1.
Figure 1:
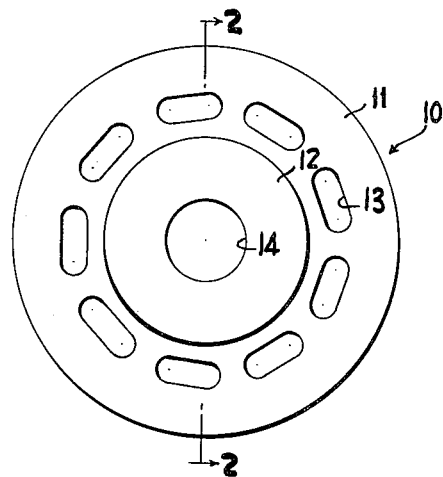
FIGURE 1 is a side view of the edge roller of this invention.

Referring now to the drawing, and in particular to FIGURES 1 and 2, there is illustrated the edge roller of this invention, generally identified as 10, which comprises a relatively thin metal disc 11 having annular hub elements 12, 12, such as fiberboard, suitably attached to the opposite sides thereof. The disc 11 is provided with a plurality of evenly spaced openings 13 between the hub elements and its outer periphery. The openings 13, as illustrated, are disposed closer to the hub elements than the outer periphery of the disc. This placement of the openings 13 is such that excessive breakage of the roller does not occur as would if the openings were more closely disposed relative to the hub elements which would reduce the width of the web between the openings, and the spacing of the openings 13 from the outer periphery of the disc is such to preclude the picking up of plastic material when the roller is used in the manner to be described.

The amount of material cut out is such to give the roller maximum flexibility without making the roller so flexible that it would be difficult to use. In addition to the structure described, the hub elements are each provided with a central aperture 14 by which the roller is grasped by an operator's fingers.

Figure 3:
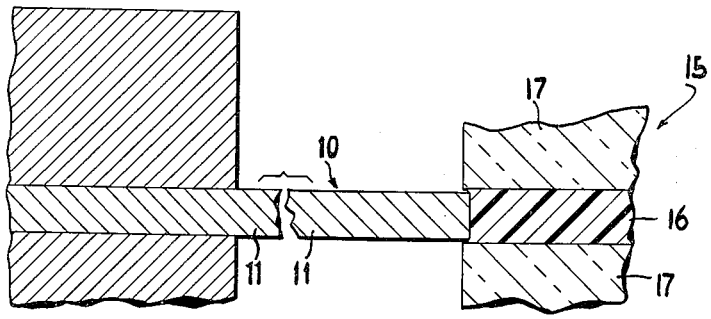
FIGURE 3 is a greatly enlarged partial sectional view of the edge roller in operation.

To describe the method of use of the edge roller 10, attention is directed to FIGURE 3, wherein there is shown a portion of the disc 11 of an edge roller 10 and a laminate, generally identified as 15, which comprises sheets of glass 17, 17 and a plastic interlayer 16. In use, the roller 10 is grasped by the central aperture 14 and the peripheral edge thereof is placed against the edge plastic interlayer 16 at the edge of the laminate 16 with slight pressure, so as to compress the plastic interlayer 16 and move it inwardly of the glass sheets 17, 17, to improve the seal of the edge portions of the plastic to the glass sheets, thereby preventing the formation of voids in the seal, and the entrance of oil therein during the final pressing operation, as previously described. Usually the roller is used more at the sharp bends, since this area is where the majority of poor edge seals occurs.

An actual edge roller 10 constructed in accordance with the teachings of this inventor comprises a spring steel disc 11 having a thickness of about 0.010 inch and a diameter of two and one-half inches to three inches. The hub elements 12, 12 are approximately one-eighth inch thick fiberboard with a diameter of approximately one and one-half inches. There are nine openings 13 spaced 40° apart, and they are spaced approximately one-fourth inch from the outer periphery of the disc and approximately three-sixteenths inch from the outer periphery of the hub elements. These openings are made by drilling two adjacent one-fourth inch holes and filing out the connecting web.

The use of the edge roller of this invention on an actual production line has resulted in about a 36 percent decrease in rejects than when the same personnel on the same line used the prior type. Considering the large number of bent automobile windshields being made and used today, it is apparent that the edge roller of this invention results in a truly remarkable decrease in rejects, and thereby introduces greater economy in the manufacture of such articles.

While this invention has been described with reference to a specific embodiment, it is to be understood that this is by way of illustration and not by way of limitation, and the claims should be construed as broadly as the prior art will permit.

I claim:
1. Apparatus for edge sealing the plastic interlayer of a prepressed laminated glass article consisting essentially of a disc having a uniform thickness of slightly less than the thickness of a plastic interlayer, means forming a hub connected to opposite sides of said disc of lesser diameter than said disc whereby said disc may be grasped and rolled along the edge of the laminated glass article and in contact with the edge of the plastic interlayer to compress the plastic interlayer at its edge and provide an improved seal between the plastic interlayer and the glass sheets forming the article, and a plurality of spaced openings in said disc disposed between and spaced from the outer periphery of said disc and said hub means, said openings increasing the flexibility of said disc.

2. Apparatus as recited in claim 1 wherein said openings are disposed closer to said hub than to the outer periphery of said disc.

References Cited in the file of this patent

UNITED STATES PATENTS

| | | |
|---|---|---|
| 1,781,084 | Sherts et al. | Nov. 11, 1930 |
| 1,953,344 | Fraser | Apr. 3, 1934 |